US006621586B1

(12) United States Patent
Kumar et al.

(10) Patent No.: US 6,621,586 B1
(45) Date of Patent: Sep. 16, 2003

(54) ACCURATELY SCHEDULING RENDERING OF BANDS IN A PRINTER

(75) Inventors: Santhosh Trichur Natrajan Kumar, Trichur Kerala (IN); Ganesh Sadasivam, Karnataka (IN)

(73) Assignee: Texas Instruments Incorporated, Dallas, TX (US)

( * ) Notice: Subject to any disclaimer, the term of this patent is extended or adjusted under 35 U.S.C. 154(b) by 7 days.

(21) Appl. No.: 10/119,048

(22) Filed: Apr. 10, 2002

(51) Int. Cl.[7] .............................. G06F 15/00; G06K 1/00
(52) U.S. Cl. ........................ 358/1.13; 358/1.16; 358/1.9
(58) Field of Search ................................ 358/1.13, 1.9, 358/1.16, 1.14, 1.18, 1.15; 400/61, 124, 322, 279; 101/467, 136, 93.04, 401.1, 463

(56) References Cited

U.S. PATENT DOCUMENTS 5,471,563 A * 11/1995 Dennis et al. ............. 358/1.15
5,524,186 A * 6/1996 Campbell .................. 358/1.16
5,533,175 A * 7/1996 Lung et al. ................ 358/1.16
5,717,840 A * 2/1998 Pardo ........................ 358/1.13
5,781,707 A * 7/1998 Kunz et al. .................. 358/1.5
5,801,716 A * 9/1998 Silverbrook ................ 345/506
5,838,333 A * 11/1998 Matsuo ........................ 345/604
6,124,943 A * 9/2000 Mitani ........................ 358/1.17
6,130,759 A * 10/2000 Blair .......................... 358/1.17
6,359,700 B1 * 3/2002 Briggs ........................ 358/1.17
6,456,387 B1 * 9/2002 Pardo et al. ............... 358/1.13
6,490,055 B1 * 12/2002 Shimizu ...................... 358/1.19
6,529,289 B1 * 3/2003 Konno et al. .............. 358/1.17

* cited by examiner

*Primary Examiner*—Andrew H. Hirshfeld
*Assistant Examiner*—Wasseem H. Hamdan
(74) *Attorney, Agent, or Firm*—Robert D. Marshall, Jr.; W. James Brady, III; Frederick J. Telecky, Jr.

(57) ABSTRACT

A printer controller which renders the bands in a plane of a page to measure the resources required to render each band of the plane. The measured parameters are used to estimate the resources required to render bands in the other planes. As a strong correlation may exist in the complexity of the same relative band in different planes, the estimation may also be accurate. As a result, complex bands may be accurately pre-scheduled for rendering, and a printer may thus ensure that bits maps of even complex bands are timely available for printing.

30 Claims, 2 Drawing Sheets

ACCURATELY SCHEDULING RENDERING OF BANDS IN A PRINTER

BACKGROUND OF THE INVENTION

1. Field of the Invention

The present invention relates to printers, and more specifically to a method and apparatus for accurately scheduling rendering of bands in a printer.

2. Related Art

Printers are often used to print a specified content (received from an external system such as personal computers) on medium such as paper. The content to be printed ("page content") is typically specified by page description languages (PDL) such as Postscript (PS) and Printer Control Language (PCL), as is well known in the relevant arts. Printing generally entails converting a page content specified by a PDL to a corresponding bit map. The bit map may then be used to print the content on the desired medium.

To facilitate generation of bit maps, a page is often divided into bands. A band generally refers to a rectangular section spanning the entire width of the page. A bit map is generally generated for each band, and sent for printing. Bit maps of consecutive bands may thus be sent to print a specified page content on a page.

Printers often generate a bit map corresponding to one band while printing a previous band. One potential problem with such an approach is that a bit map of a band may not be generated (or unavailable in general) by the time a previous band has been sent for printing. Such unavailability may be undesirable at least in laser technology based printers in that the printer may not be able to stop in the middle of printing a page. One approach to address such a problem is to render all the bands in a page before beginning to printing the page. Unfortunately, such solutions may require large amounts of memory and may thus be undesirable.

In an alternative approach, an attempt is made to determine the bands ("complex bands") which require more processing time/power to generate corresponding bit maps by examining the PDL and/or the display lists for the bands. The complex bands may then be scheduled for rendering ahead of potentially several earlier bands in a page. As a result, a printer may increase the probability that the bit maps of even the complex bands are timely available for sending to printing.

Unfortunately, the approaches (based on examination of PDL and/or display lists) used for estimation of complexity are often imprecise. In other words, the complexity may be over-estimated or under-estimated. In case of under-estimation, the bit map may not be timely available to send for printing. As a result, the corresponding page may not be printed accurately.

In case of over-estimation, a page may be rendered ahead of actual need, in which case available memory is unnecessarily used to store the generated bit maps. If a printer is constrained by memory space availability, the bit maps may be stored in compressed format and then decompressed before sending for printing. Unfortunately, compression and decompression consume processing cycles, and may thus be undesirable. To use available memory-more efficiently, a printer may use 'lossy' compression techniques, in which case the quality of printed images may suffer.

Therefore, what is needed is a method and apparatus to accurately schedule rendering of bands in a printer.

SUMMARY OF THE INVENTION

An embodiment of a printer controller in accordance with the present invention may render a portion in a plane of a page to determine the resources e.g., processing time and/or memory required to render the portion. The measured parameters may then be used to estimate the resources required to render the portions in the other planes. The estimations in turn can be used to pre-schedule complex portions for rendering such that the bit maps of the complex portions are timely available for printing.

As a strong correlation may exist between similarly situated portions in different planes, the measured parameters may accurately reflect the worst case complexity of the bands in all the planes. Accordingly, only necessary portions may be pre-scheduled for rendering, thereby leading to efficient use of memory space. In one embodiment, each portion corresponds to a band spanning the entire page width.

In one implementation, the page content is first converted to CMYK color space if the PDL statements provide the data in other color spaces, and the black (K) plane is rendered first to measure the resources required. As the K-plane typically contains a corresponding component of any object in the other three (CMY) planes, the bands in the K-plane may accurately reflect the complexity of bands in other planes.

By accurately estimating the complexity of different portions of a page, the portions can be pre-scheduled accurately. As a result, bit maps of the portions may be timely available for printing and pages may be printed accurately. In addition, the available memory and processing power may not be wasted due to any use of compressions techniques.

Further features and advantages of the invention, as well as the structure and operation of various embodiments of the invention, are described in detail below with reference to the accompanying drawings. In the drawings, like reference numbers generally indicate identical, functionally similar, and/or structurally similar elements. The drawing in which an element first appears is indicated by the leftmost digit(s) in the corresponding reference number.

BRIEF DESCRIPTION OF THE DRAWINGS

The present invention will be described with reference to the accompanying drawings, wherein.

DETAILED DESCRIPTION OF THE PREFERRED EMBODIMENTS

1. Overview and Discussion of the Invention

A printer in accordance with the present invention may measure the resources (e.g, processing time, memory requirements) required to render one of the color planes of a page. The resources measured are then used to estimate the resource requirements for rendering bands in other planes. Bands of such other planes may be scheduled for rendering according to the measured parameters. Bands requiring more resources ("complex bands") may be pre-scheduled for rendering such that the pre-scheduled bands are timely available for printing.

As there generally exists a strong co-relationship between resource requirements for rendering a band in one plane and for rendering the corresponding bands in other planes, the resource requirements for rendering bands in the other planes may be accurately estimated. Consequently, complex bands may be appropriately pre-scheduled for rendering. Thus, a printer may ensure that the bit maps for the complex bands are timely available for printing. In addition, as the estimation of resource requirements may be accurate, memory may be used to store bit maps of only the complex bands. As a result, available memory may be optimally used.

Several aspects of the invention are described below with reference to example environments for illustration. It should be understood that numerous specific details, relationships, and methods are set forth to provide a full understanding of the invention. One skilled in the relevant art, however, will readily recognize that the invention can be practiced without one or more of the specific details, or with other methods, etc. In other instances, well-known structures or operations are not shown in detail to avoid obscuring the invention.

2. Example Printer

Figure 1:
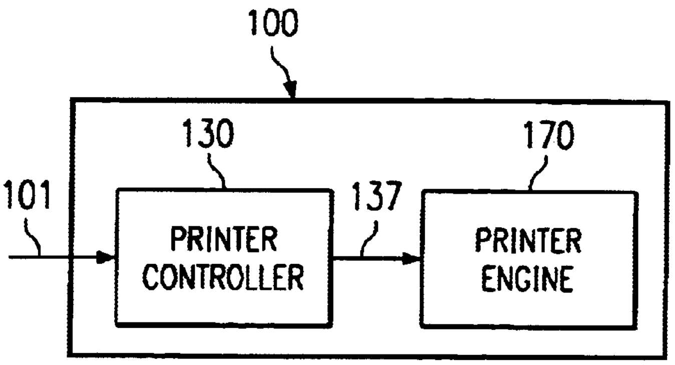
FIG. 1 is a block diagram illustrating the details of an example printer.

FIG. 1 is a block diagram illustrating the details of an embodiment of printer 100 in accordance with the present invention. Printer 100 is shown containing printer controller 130 and printer engine 170. Each component is described in further detail below.

Printer engine 170 receives on path 137 bit maps (representing the page content to be printed) suitable in format for printing, and prints the page content on medium such as paper. Printer engine 170 can be implemented in a known way. In an embodiment, printer engine 170 is implemented using laser technology.

Printer controller 130 may receive statements defining a page content to be printed on path 101, which may be from an external computer system (not shown). The statements may be specified in a page description language (PDL) such as Printer Control Language (PCL) or PostScript, well known in the relevant arts.

Printer controller 130 generates bit maps representing the page content specified by the PDL statements received on line 101. The bitmaps may be generated for different planes of a page. As is well known, the planes may refer to red, green and blue (RGB) plane, cyan, magenta, yellow black (CMYK) plane, etc. The bit maps generated for the various color planes of the page together represent the page content.

As noted above, some of the bands may need to be pre-scheduled for rendering to ensure that the bits maps of the bands are timely available for sending on path 137 for printing. The manner in which printer controller 130 may ensure that all the bit maps are timely available is described below with examples.

3. Method

Figure 2A:
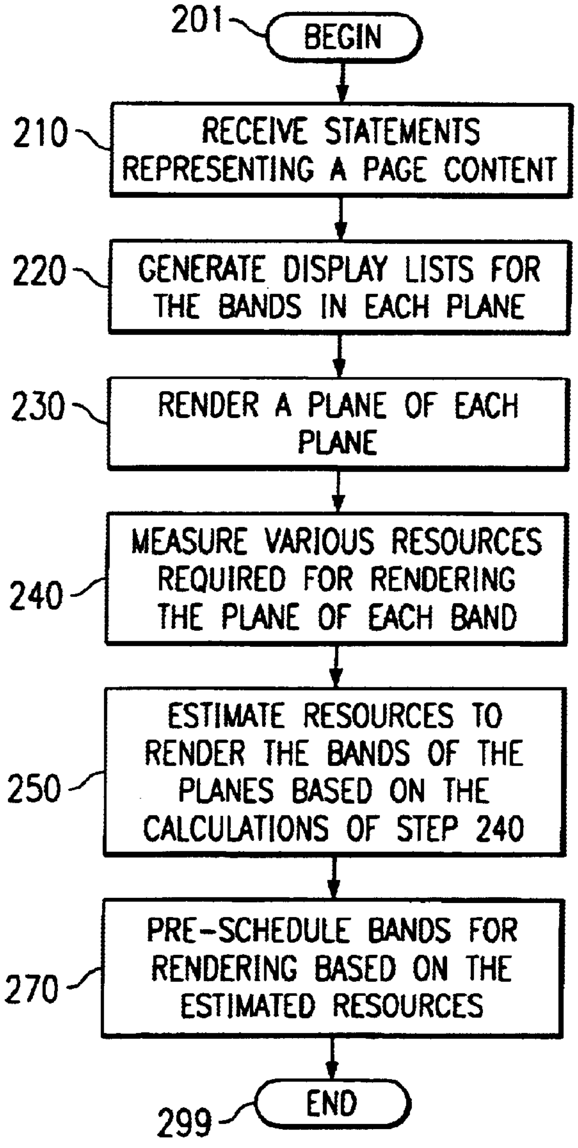
FIG. 2A is a flow chart illustrating the manner in which bands of a page may be scheduled according an aspect of the present invention.
Figure 2B:
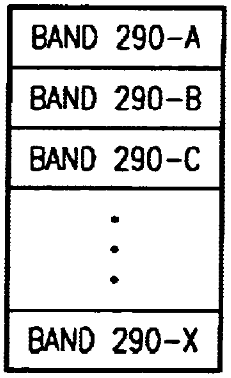
FIG. 2B is a diagram illustrating the bands in one of the planes defining a page content.

FIG. 2 is a flow chart illustrating the manner in which a printer may ensure that bit maps of bands are timely available for printing according to an aspect of the present invention. The method is described with reference to FIG. 1 for illustration. However, the method can be implemented in other printers as well. The method is described with reference to the plane depicted in FIG. 2B. The method of FIG. 2A begins in step 201, in which control immediately passes to step 210.

In step 210, printer controller 130 receives statements representing a page content according to a PDL. In step 220, printer controller 130 generates a display list for each band in a plane(s). As is well known, page content is often generated in multiple planes, and the bit maps representing the planes together define page content. Steps 210 and 220 may be implemented in a known way.

In step 230, printer controller 130 renders the bands in a plane. In step 240, printer controller 130 measures various resources required for rendering the bands of the plane. Examples of the measured resources may include, but not limited to, the processing time taken to render the band, the memory space required to store the rendered bit map, etc.

In step 250, printer controller 130 may estimate the resources required for rendering the bands in the other planes based on the resources measured in step 240. In an embodiment, only the processing time required to render a plane is measured for one plane and estimated for others. As there may exist a strong correlation between the complexity of a band in one plane and the corresponding (i.e., in the same position) bands in other planes, the estimations may be accurate.

In step 270, printer controller 130 may pre-schedule bands based on the resources estimated in step 250. In general, any approach (e.g., based directly on the measured resources or by applying complex statistical approaches) may be used using the measurements of step 230. As the estimates may be based on accurate parameters (measured using actual rendering in step 230), complex pages maybe accurately pre-scheduled and the corresponding bit maps may be timely available for printing.

In an embodiment, each band in the later planes is scheduled based on the parameters measured for the corresponding band rendered in step 230. As may be appreciated, each plane contains several bands. In FIG. 2B, a plane is shown containing bands 290-A through 290-X. In general, bands 290-A through 290-X are scheduled for rendering successively. However, depending on the measured resources, one of the bands may be scheduled ahead of the earlier bands. For example, assuming that band 290-D in one plane is measured to require a lot of processing power, band 290-D (in similar position to the measured band) may be scheduled ahead of band 290-C in other planes for rendering.

The bands are depicted as spanning the entire width of the page. However, it should be appreciated that the present invention can be applied using portions of a plane not spanning the entire page width. That is, a portion of a plane may be rendered, the required resources measured, and the corresponding portions in the other planes may be scheduled according to the measured resources.

As may be appreciated from the above, the plane rendered in step 230 needs to be selected such that the complexity of the bands of the plane accurately reflects the complexity of the corresponding bands in other planes. The manner in which the plane may be selected is described below with reference to CMYK color space often used in printers.

4. CMYK Color Spaces

As is well known, page content represented in CMYK color space generally contains four planes corresponding to the four colors, namely, cyan (C), Magenta (M), Yellow (Y) and black (K). Even if a page content is represented in other color spaces (e.g., in RGB), the page content may be converted into CMYK in a known way.

As noted above, the complexity of the bands in the plane selected first for rendering should generally reflect the complexity of the corresponding bands in the other planes. In the CMYK space, black plane may satisfy such a requirement, for example, because any object which may be represented in the cyan, magenta and yellow planes has a corresponding component in the black plane.

Thus, in an embodiment, printer controller 130 may first render the black (K) plane of the page. The resources required to render the bands in the black plane of the page are measured, and the bands in the other planes may be scheduled based on the measured resources. The description is continued with reference to example embodiments of printer controller 130.

5. Printer Controller

Figure 3:
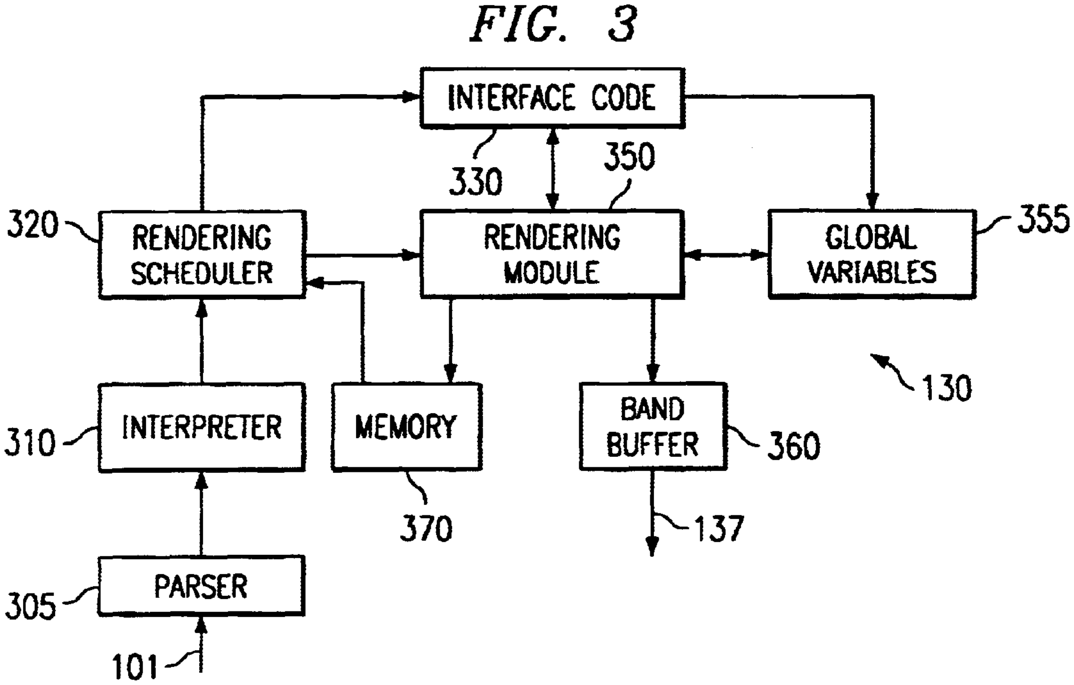
FIG. 3 is a block diagram illustrating the details of an embodiment of a printer controller.

FIG. 3 is a block diagram illustrating the details of an embodiment of printer controller 130 implemented in accordance with the present invention. Printer controller 130 is shown containing parser 305, interpreter 310, rendering scheduler 320, interface code 330, rendering module 350, global variables block 355, band buffer 360 and memory 370. Each component is described in further detail below.

Parser 305 ensures that the statements (describing a page content) received on path 101 are consistent with a page description language (PDL), and passes the received statements to interpreter 310. Interpreter 310 converts the statements received in PDL format to a display list for each band of a page. Parser 305 and interpreter 310 may be implemented in a known way.

Interface code 330 provides the interface between rendering scheduler 320 and rendering module 350. In general, interface code 330 interfaces with rendering scheduler 320, and performs various initializations required for rendering module 350. Global variables 355 represents various values used for rendering (and other operations) which generates bit maps representing the page.

Rendering module 350 generates a bit map for each band (in the page) scheduled by rendering scheduler 320. The generated bit maps may be stored in band buffer 360, which can reduce the overhead of measurement. When a band of a first plane of a page is rendered, rendering module 350 measures the resources required to render the page, and stores the measured parameters in memory 370. In an embodiment, parameters are measured for the bands of a black plane in CMYR color space.

The bit maps generated for measuring resources may also be stored in band buffer 360. However, in situations such as if rendering a bit map consumes minimal processing power, but the bit map would occupy a lot of memory space, the generated bit map may simply be ignored, and re-generated later again as needed.

Rendering scheduler 320 schedules each band for rendering. Thus, the bands of a first plane of a page content may be scheduled for rendering first. As noted above, rendering module 350 may store parameters reflecting the resources required for the bands in the first plane.

Accordingly, rendering scheduler 320 may retrieve the stored parameters from memory 370 to estimate the complexity of the bands in the other planes, and schedule the bands for rendering. Any approach may be used for estimating the complexity of the bands. In an embodiment implemented in the form of software, only the processing time (in milli-seconds) required to render a band is measured. If the time exceeds a pre-specified threshold, the corresponding bands in the other planes are scheduled for rendering ahead. In general, a band may be pre-scheduled ahead by an amount of time proportionate to the measured time.

From the above, it may be appreciated that printer controller 130 may potentially have two types of rendering—(1) for generating the bits maps to send to printer engine 170; and (2) for estimating the complexity of various portions of a plane. In general, printer controller 130 needs to be implemented while balancing the various resources required to perform the two types of rendering.

Thus, using the approaches described above, several embodiments of printer 100 may be implemented. The embodiments may be implemented in a combination of software, hardware and firmware. The description is continued with reference to an embodiment of printer controller 130 implemented substantially in software.

6. Software Implementation

Figure 4:
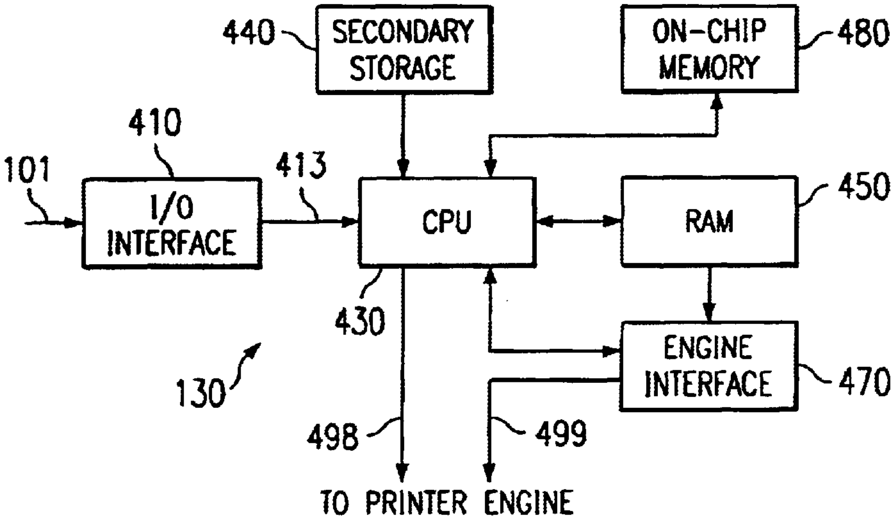
FIG. 4 is a block diagram illustrating the details of an embodiment of a printer controller implemented substantially in software.

FIG. 4 is a block diagram illustrating the details of printer controller 130 implemented in software according to an aspect of the present invention. Printer controller 130 is shown containing input/output (I/O) interface 410, central processing unit (CPU) 430, secondary storage 440, random access memory (RAM) 450, engine interface 470 and on-chip memory 480. Each component is described below in further detail.

Input/output interface 410 provides the interface with an external system such as personal computer (not shown). I/O interface 410 receives statements on path 101 specifying a page content according to a page description language (PDL) such as Printer Control Language (PCL) or PostScript. I/O interface 410 forwards the statements to CPU 430 on line 413.

Engine interface 470 provides an interface between printer controller 130 and printer engine 170. Engine interface 470 retrieves the bit maps from RAM 450, and sends the retrieved bits on path 499. Path 498 may provide the control signals corresponding to the data transfers and other aspects of interface between printer controller 130 and printer engine 170. Lines 498 and 499 together represent line 137 illustrated in FIG. 1. Engine interface 470 may be implemented in a known way.

Secondary memory 440 may contain units such as hard drive (not shown), removable storage (e.g., flash memory, also not shown). Secondary storage 440 may store software instructions and data (for example, the global parameters), which enable CPU 430 to provide several features in accordance with the present invention. The software instructions may be provided to CPU 430 from other sources such as over a network implemented using protocols such as TCP/IP.

CPU 430 executes the instructions provided from secondary memory to process the print statements and generate bit maps representing the bands forming the page. The bands in various planes may be scheduled for rendering as described in the previous sections. The resulting bit maps may be eventually stored in RAM 450. The instructions may also cause the bit map to be provided to printer engine 170 on path 498.

RAM 450 may be used to store the instructions prior to execution. In addition, RAM 450 may be used to implement band buffer 360 and memory 370. On-chip memory 480 stores the rendered bit maps, which are eventually transferred to band buffer implemented in RAM 450.

An embodiment of the present invention is implemented using software running (that is, executing) in printer controller 130. In this document, the term "computer program product" is used to generally refer to removable storage unit or hard disk installed in hard drive. These computer program products are means for providing software to printer 100. These computer program products generally contain computer readable medium providing software to printer controller 130. The computer readable medium can be provided external to printer controller 130.

7. Conclusion

While various embodiments of the present invention have been described above, it should be understood that they have been presented by way of example only, and not limitation. Thus, the breadth and scope of the present invention should not be limited by any of the above described exemplary embodiments, but should be defined only in accordance with the following claims and their equivalents.

What is claimed is:

1. A method of generating a first plurality of bit maps representing a page content to be printed on a page in a printer, wherein said page is printed as a plurality of planes, said method comprising:

receiving a plurality of statements according to a page description language (PDL), wherein said plurality of statement define said page content;

generating a display list representing a first portion in a first plane by examining said plurality of statements, said first plane being contained in said plurality of planes;

rendering said first portion to generate a first bit map;

measuring a resource required for rendering said first portion; and scheduling a second portion in a second plane for rendering according to said resource measured in said measuring.

2. The method of claim 1, wherein said first portion and said second portion respectively comprise a first band, and a second band.

3. The method of claim 2, wherein said second band is located in a similar position in said second plane as said first band is located in said first plane.

4. The method of claim 3, wherein said resource comprises an amount of processing time required to render said first band, and wherein said scheduling pre-schedules said second band if said amount of processing time exceeds a pre-determined threshold.

5. The method of claim 4, wherein said measuring measures a plurality of resources required to render said first band, and said scheduling schedules said second band according to said plurality of resources.

6. The method of claim 5, wherein said plurality of resources comprises an amount of memory required to store a first bit map generated by said rendering.

7. The method of claim 5, further comprising storing said first bit map in a band buffer.

8. The method of claim 5, wherein said generating generates a plurality of display lists associated with a corresponding plurality of bands contained in said first plane, and wherein said rendering renders all bands in said first plane to generate a corresponding plurality of bit maps.

9. The method of claim 8, wherein said first band comprises a rectangular band spanning an entire page.

10. The method of claim 1, wherein said plurality of planes comprise cyan, magenta, yellow and black (CMYK) planes, and wherein said first plane comprises black plane.

11. A printer controller for generating a first plurality of bit maps representing a page content to be printed on a page in a printer, wherein said page is printed as a plurality of planes, said printer controller comprising:

means for receiving a plurality of statements according to a page description language (PDL), wherein said plurality of statement define said page content;

means for generating a display list representing a first portion in a first plane by examining said plurality of statements, said first plane being contained in said plurality of planes;

means for rendering said first portion to generate a first bit map;

means for measuring a resource required for rendering said first portion; and means for scheduling a second portion in a second plane for rendering according to said resource measured in said means for measuring.

12. The printer controller of claim 11, wherein said first portion and said second portion respectively comprise a first band and a second band.

13. The printer controller of claim 12, wherein said second band is located in a similar position in said second plane as said first band is located in said first plane.

14. The printer controller of claim 13, wherein said resource comprises an amount of processing time required to render said first band, and wherein said means for scheduling pre-schedules said second band if said amount of processing time exceeds a pre-determined threshold.

15. The printer controller of claim 14, wherein said means for measuring measures a plurality of resources required to render said first band, and said means for scheduling schedules said second band according to said plurality of resources.

16. The printer controller of claim 15, wherein said plurality of resources comprises an amount of memory required to store a first bit map generated by said means for rendering.

17. The printer controller of claim 15, further comprising means for storing said first bit map in a band buffer.

18. The printer controller of claim 15, wherein said means for generating generates a plurality of display lists associated with a corresponding plurality of bands contained in said first plane, and wherein said means for rendering renders all bands in said first plane to generate a corresponding plurality of bit maps.

19. The printer controller of claim 18, wherein said first band comprises a rectangular band spanning an entire page.

20. The printer controller of claim 11, wherein said plurality of planes comprise cyan, magenta, yellow and black (CMYK) planes, and wherein said first plane comprises black plane.

21. A computer readable medium carrying one or more sequences of instructions for causing a printer to generate a first plurality of bit maps representing a page content to be printed, wherein said page is printed as a plurality of planes, wherein execution of said one or more sequences of instructions by a processor contained in said printer causes said processor to perform the actions of:

receiving a plurality of statements according to a page description language (PDL), wherein said plurality of statement define said page content;

generating a display list representing a first portion in a first plane by examining said plurality of statements, said first plane being contained in said plurality of planes;

rendering said first portion to generate a first bit map;

measuring a resource required for rendering said first portion; and scheduling a second portion in a second plane for rendering according to said resource measured in said measuring.

22. The computer readable medium of claim 21, wherein said first portion and said second portion respectively comprise a first band and a second band.

23. The computer readable medium of claim 22, wherein said second band is located in a similar position in said second plane as said first band is located in said first plane.

24. The computer readable medium of claim 23, wherein said resource comprises an amount of processing time required to render said first band, and wherein said scheduling pre-schedules said second band if said amount of processing time exceeds a pre-determined threshold.

25. The computer readable medium of claim 24, wherein said measuring measures a plurality of resources required to render said first band, and said scheduling schedules said second band according to said plurality of resources.

26. The computer readable medium of claim 25, wherein said plurality of resources comprises an amount of memory required to store a first bit map generated by said rendering.

27. The computer readable medium of claim 25, further comprising storing said first bit map in a band buffer.

28. The computer readable medium of claim 25, wherein said generating generates a plurality of display lists associated with a corresponding plurality of bands contained in said first plane, and wherein said rendering renders all bands in said first plane to generate a corresponding plurality of bit maps.

29. The computer readable medium of claim 28, wherein said first band comprises a rectangular band spanning an entire page.

30. The computer readable medium of claim 21, wherein said plurality of planes comprise cyan, magenta, yellow and black (CMYK) planes, and wherein said first plane comprises black plane.

* * * * *